(12) United States Patent
Thorat et al.

(10) Patent No.: US 12,449,090 B2
(45) Date of Patent: Oct. 21, 2025

(54) ATTACHMENT DEVICE FOR CLAMPING TO A STRUCTURAL COMPONENT

(71) Applicant: Eaton Intelligent Power Limited, Dublin (IE)

(72) Inventors: Hemraj Keda Thorat, Pune (IN); Harshad Keskar, Pune (IN); Amol Anil Khalkar, Pune (IN); Jason Sabel, Northborough, MA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 310 days.

(21) Appl. No.: 17/376,979

(22) Filed: Jul. 15, 2021

(65) Prior Publication Data

US 2022/0018495 A1 Jan. 20, 2022

Related U.S. Application Data

(60) Provisional application No. 63/053,156, filed on Jul. 17, 2020.

(51) Int. Cl.
*F16B 2/06* (2006.01)
*F16M 13/02* (2006.01)

(52) U.S. Cl.
CPC ............... *F16M 13/02* (2013.01); *F16B 2/06* (2013.01)

(58) Field of Classification Search
CPC ...... F16B 2/02; F16B 2/04; F16B 2/06; F16B 7/04; F16B 7/0406; F16B 7/0433
USPC ....... 248/229.2, 229.24, 228.1, 228.5, 228.6; 52/127.2, 695, 697
See application file for complete search history.

(56) References Cited

U.S. PATENT DOCUMENTS

| | | | | |
|---|---|---|---|---|
| 1,623,892 | A * | 4/1927 | Sobray | ...................... E04G 5/04 248/220.21 |
| 5,598,785 | A * | 2/1997 | Zaguroli, Jr. | ........... E01B 25/24 104/111 |
| 6,464,422 | B1 | 10/2002 | Kirschner | |
| 8,561,373 | B1 * | 10/2013 | McDonald | ................ E04C 3/14 52/847 |
| 10,415,616 | B2 | 9/2019 | Nehls | |
| 2017/0336021 | A1 | 11/2017 | Anderson | |

FOREIGN PATENT DOCUMENTS

| | | |
|---|---|---|
| CN | 115768987 A | 3/2023 |
| KR | 20130032989 A | 4/2013 |
| KR | 20190015856 A | 2/2019 |
| WO | 2016032079 A1 | 3/2016 |

* cited by examiner

*Primary Examiner* — Alfred J Wujciak
(74) *Attorney, Agent, or Firm* — Stinson LLP

(57) ABSTRACT

An attachment device for attaching to a structural component of a building to couple a fitting to the structural component.

14 Claims, 7 Drawing Sheets

ATTACHMENT DEVICE FOR CLAMPING TO A STRUCTURAL COMPONENT

REFERENCE TO RELATED APPLICATIONS

This application claims the benefit of U.S. Provisional Application No. 63/053,156, filed Jul. 17, 2020, the entire contents of which are incorporated herein by reference.

FIELD OF THE DISCLOSURE

The present disclosure generally relates to attachment devices for attaching to a structural component of a building.

BACKGROUND OF THE DISCLOSURE

Seismic supporting systems are used to support non-structural components (e.g., pipes) in a building. Seismic supporting systems typically include seismic sway braces and restraints. Sway braces and restraints are used to secure non-structural components to a building and minimize the differential movement between the non-structural components and the structural components and/or building itself. Examples of non-structural components in a building include, but are not limited to, pipes, conduits, round ducts, fittings, cable trays, etc. An attachment device attaches to a structural element of the building (e.g., a joist/lumber) and the sway brace or restraint, thereby securing the non-structural component to the building.

SUMMARY OF THE DISCLOSURE

The present disclosure is directed to an attachment device for attaching to a structural component of a building to couple a fitting to the structural component, the attachment device comprising a plate member configured to be attached directly to the structural component and engaged by the fitting to mount the fitting to the attachment device for coupling the fitting to the structural component, the plate member being configured for attachment to the structural component by making no more than one hole in the structural component.

The present disclosure is also directed to an attachment device assembly for attaching to a structural component of a building to couple a fitting to the structural component, the attachment device assembly comprising a first attachment device configured to be attached to a first side of the structural component, and a second attachment device configured to be attached to a second side of the structural component, the attachment devices being configured for attachment to the structural component through one of a clamping, frictional, and biting engagement such that no holes are formed through the structural component.

BRIEF DESCRIPTION OF THE DRAWINGS

Corresponding reference characters indicate corresponding parts throughout the drawings.

DETAILED DESCRIPTION OF THE DISCLOSURE

Overall, the attachment devices of the various embodiments described herein are for attaching to a structural component. The attachment devices can be secured to any structural element of a building such as a beam, floor, ceiling, for example. In the illustrated embodiment, the attachment devices are secured to I-joists. The term structural component includes, but is not limited to, a sway brace, a restraint, and building structural elements, such as beams, floors, joists, columns, ceilings etc. The various attachment devices are each configured to securely attach to the structural component (i.e., I-joist) and make a minimal number of holes in the structural component to form the secure attachment. In some cases, the attachment devices form the secure attachment without making any holes in the structural component. Thus, the attachment devices are configured to maintain the strength and structural integrity of the structural component after attachment to the structural component. Therefore, the various attachment devices of the present disclosure allow builders (e.g., construction workers, contractors, etc.) to brace or restrain non-structural components to the structural component without damaging the structural component.

Figure 1:
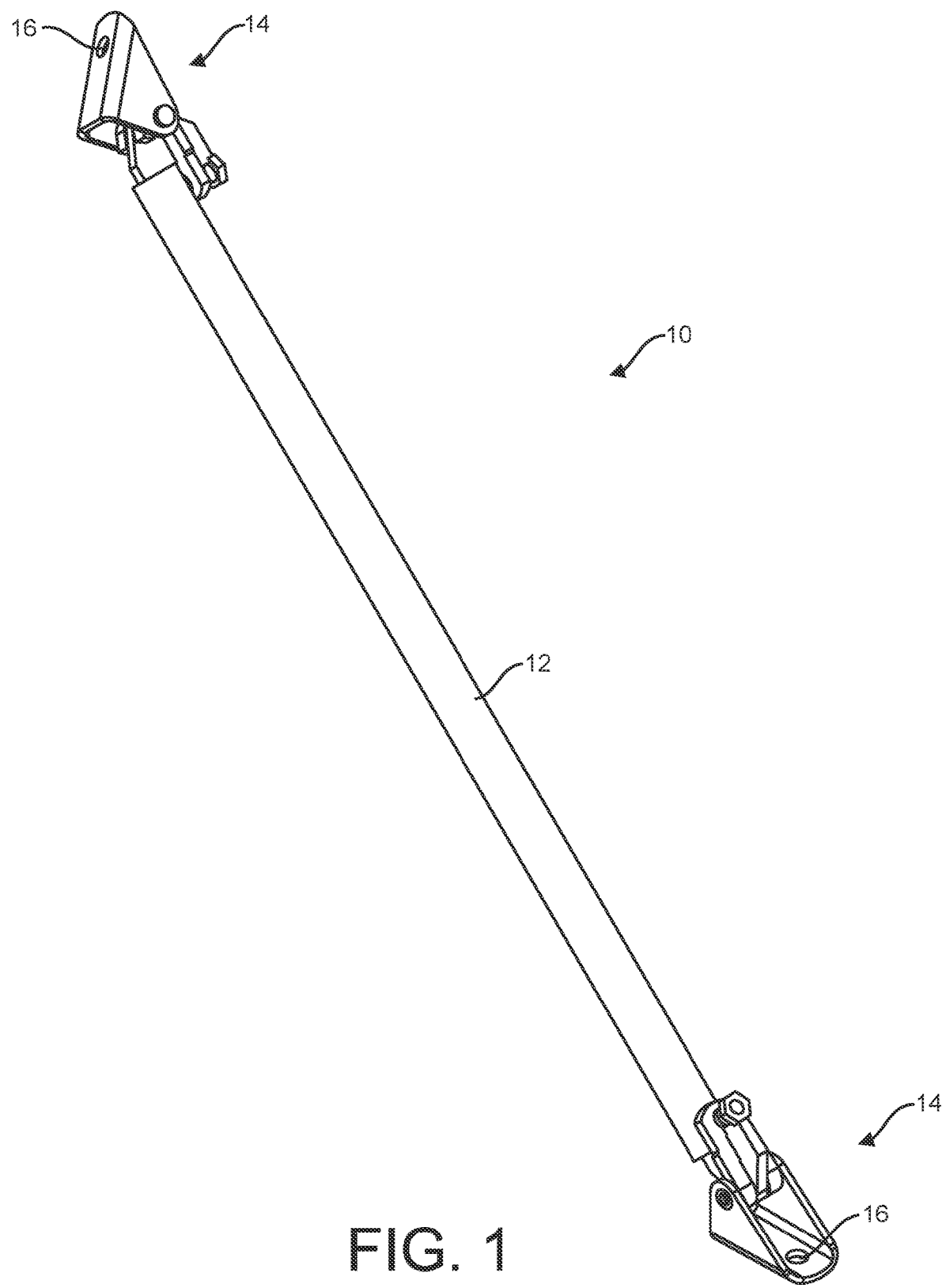
FIG. 1 is a perspective of one example of a sway brace/restraint that can be used with attachment devices of the present disclosure.

Referring to FIG. 1, one example of a suitable sway brace or restraint that can be used with the various attachment devices described below is generally indicated at reference numeral 10. As generally known in the art, the sway brace/restraint 10 includes a strut 12 (e.g., pipe, bar, rod, etc.) and opposite connection fittings 14 at each end of the strut. One connection fitting 14 may be used to attach the sway brace/restraint 10 to a structural component (e.g., I-joist of a building) and the opposite connection fitting 14 can be used to attach the sway brace/restraint to a non-structural component (e.g., pipes, conduits, round ducts, fittings, cable trays, etc.). When the attachment device is coupled to the non-structural component, the sway brace/restraint spans between the structural component and the non-structural component, thereby supporting the non-structural component in the building. In the illustrated embodiment, each of the connection fittings 14 are identical and define a fastener opening 16 that can be used to connect the connection fitting to any one of the various attachment devices, as described in more detail below. It is understood that the sway brace/restraint 10 in FIG. 1 is illustrative and that the various attachment devices of the present disclosure may be used with any suitable sway brace/restraint. For example, the sway brace/restraint may be a seismic sway brace/restraint. Furthermore, it is contemplated that any one of the various attachment devices described below may be directly connected to the strut 12 of the sway brace/restraint 10 (e.g., replace one of the connection fittings 14 at one end of the strut 12), as is generally known in the art.

Figure 2:
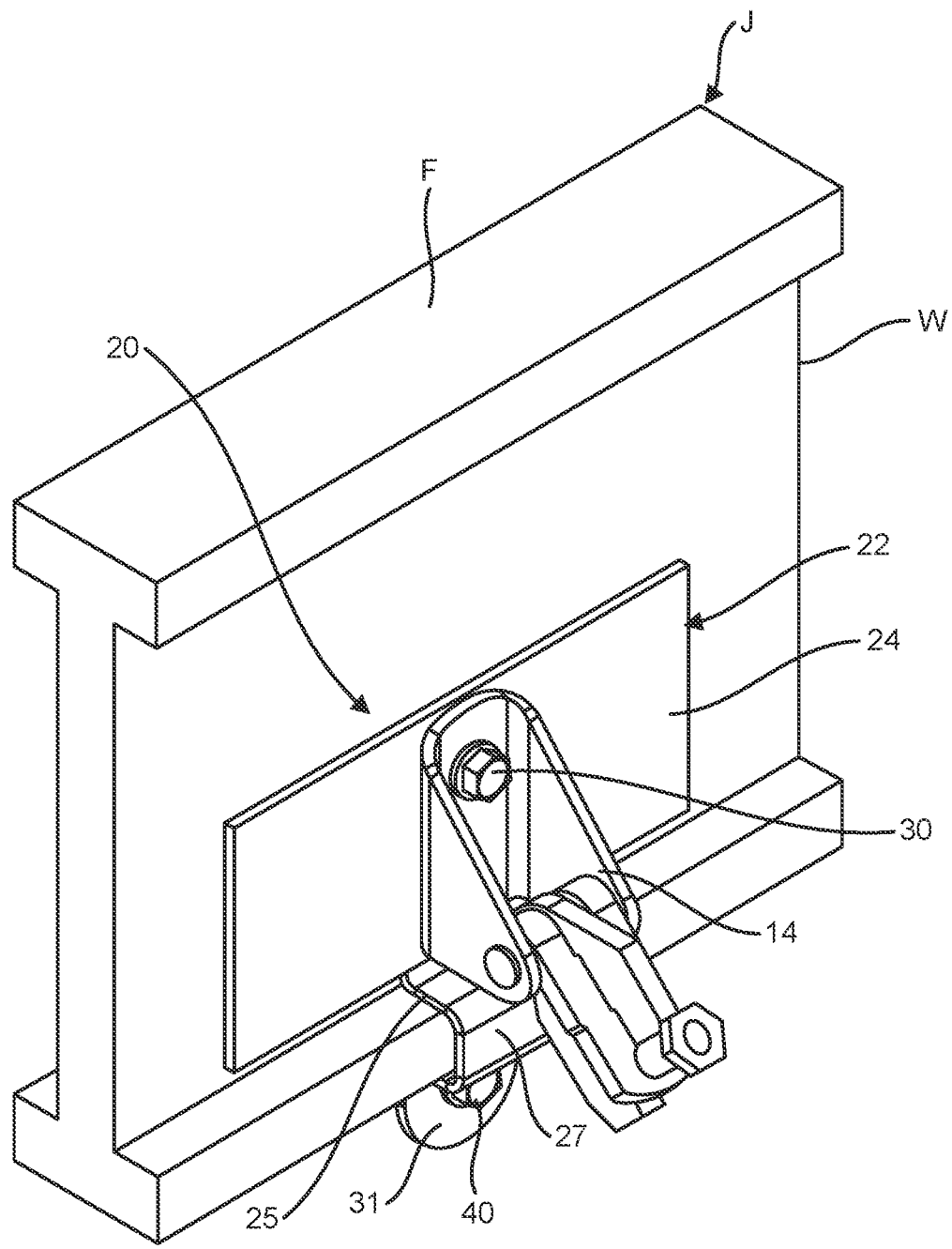
FIG. 2 is a perspective of a first embodiment of an attachment device attached to a structural component according to the teachings of the present disclosure.
Figure 3:
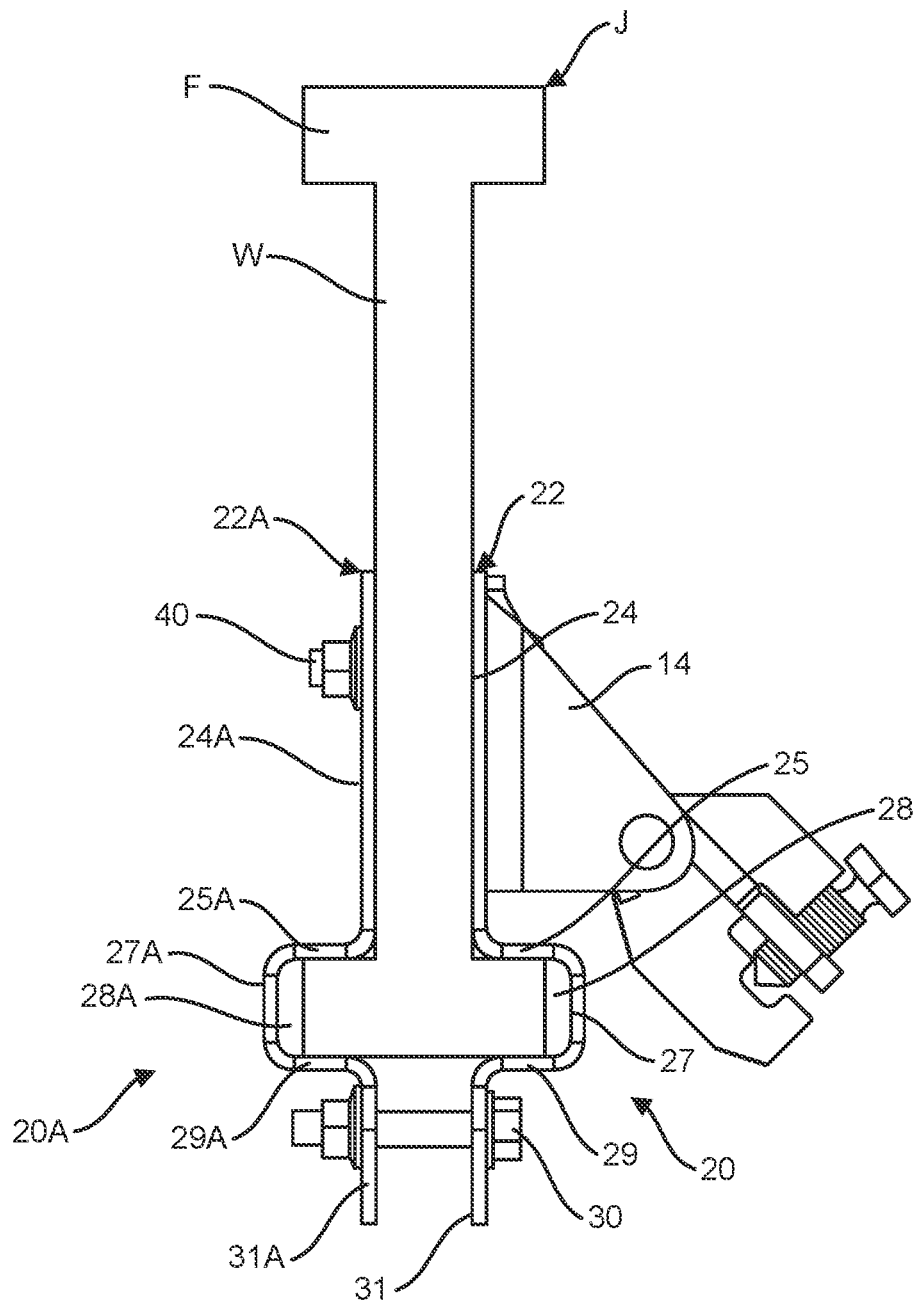
FIG. 3 is a side view of the attachment device and structural component of FIG. 2 and further showing a second attachment device.

Referring to FIGS. 2-3, a first embodiment of an attachment device for coupling to a structural component, is generally indicated at reference numeral 20. As shown in FIG. 2, attachment device 20 is configured to be attached to a structural component, such as a wooden I-joist J, and to a connection fitting 14 for attachment to a suitable sway brace restraint, or the like. The attachment device 20 includes a body or plate member 22 configured to be attached to the joist J.

The plate member 22 has a first planar portion 24, a second planar portion 25 extending from the first planar portion, a third planar portion 27 extending from the second planar portion, a fourth planar portion 29 extending from the third planar portion, and a fifth planar portion 31 extending from the fourth planar portion. The first planar portion 24 provides a contact surface for engaging the web W of the joist J. In the illustrated embodiment, the first planar portion has a rectangular shape. However, the first planar portion 24 could be formed in any suitable shape such as round or oblong without departing from the scope of the disclosure. The second portion 25 extends orthogonally from the first planar portion 24 and provides a contact surface for engaging a top of the bottom flange F of the joist J. The third planar portion 27 extends orthogonally from the second planar portion 25 and extends generally parallel to and opposite a side edge of the bottom flange F of the joist J. A clearance gap 28 is formed between an inner surface of the third planar portion 27 and the side edge of the bottom flange F of the joist J. The fourth planar portion 29 extends orthogonally from the third planar portion 27 and provides a contact surface for engaging a bottom of the bottom flange F of the joist J. The fifth planar portion 31 extends orthogonally from the fourth planar portion 29. A fastener hole (not shown) in the fifth planar portion 31 is configured to receive a fastener 30 for securing the attachment device 20 to the joist J. In one embodiment, the fastener 30 is a standard bolt fastener. A hole (not shown) in the first planar portion 24 is configured to receive a fastener 40 for attaching the fitting 14 to the attachment device 20. In one embodiment, the fastener 40 is a standard bolt fastener.

The attachment device 20 may be considered a first attachment device, and is configured for attachment to a first face of the web W of the joist J. A second attachment device 20A is configured for attachment to an opposite face of the web W of the joist J. The second attachment device 20A comprises a plate member 22A including a first planar portion 24A, a second planar portion 25A extending from the first planar portion 24A, a third planar portion 27A extending from the second planar portion, a fourth planar portion 29A extending from the third planar portion, and a fifth planar portion 31A extending from the fourth planar portion. The first planar portion 24A provides a contact surface for engaging the web W of the joist J. The second planar portion 25A extends orthogonally from the first planar portion 24A and provides a contact surface for engaging the top of the bottom flange F of the joist J. The third planar portion 27A extends orthogonally from the second planar portion 25A and extends generally parallel to and opposite an opposite side edge of the bottom flange F of the joist J. A clearance gap 28A is formed between an inner surface of the third planar portion 27A and the opposite side edge of the bottom flange F of the joist J. The fourth planar portion 29A extends orthogonally from the third planar portion 27A and provides a contact surface for engaging the bottom of the bottom flange F of the joist J. The fifth planar portion 31A extends orthogonally from the fourth planar portion 29A. A fastener hole (not shown) in the fifth planar portion 31A is configured to receive the fastener 30 for securing the two attachment devices 20, 20A to the joist J. In the illustrated embodiment, the attachment devices 20, 20A are secured around the bottom flange F. However, the attachment devices 20, 20A could be secured around the top flange F.

Figure 4:
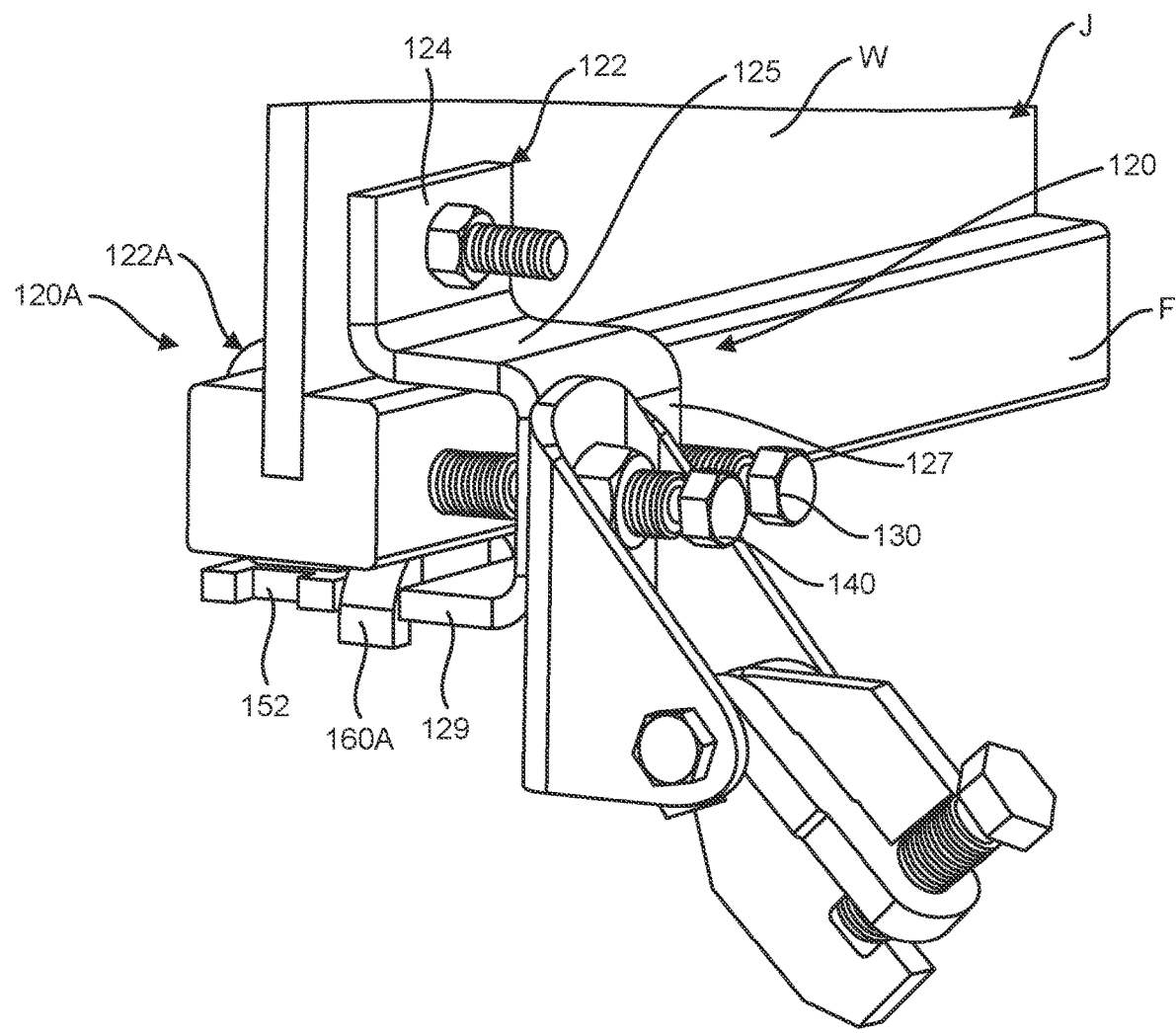
FIG. 4 is a perspective of a second embodiment of an attachment device attached to a structural component according to the teachings of the present disclosure.

The fastener 30 does not extend through the joist J. Rather, only fastener 40 extends through the joist J. Therefore, securing the attachment devices 20, 20A to the joist J involves making only a single hole through the web W of the joist. Accordingly, the strength and structural integrity of the joist J is maintained after attachment of the attachment devices 20, 20A. The use of the two attachment devices 20, 20A also allows the size of each attachment device to be reduced while still providing a sufficient attachment structure. Additionally, the clearance gaps 28, 28A between the third planar surfaces 27, 27A and the flange F of the joist J allow for the attachment devices 20, 20A to be used with varying size joists. In particular, the clearance gaps 28, 28A allow the attachment devices 20, 20A to be used with joists having thicker webs and/or thicker/wider flanges Referring to FIG. 4, a second embodiment of an attachment device for attaching to a structural component is generally indicated at reference numeral 120. The attachment device 120 is configured to be attached to a structural component, such as a wooden I-joist J, and to a connection fitting 14 for attachment to a suitable sway brace restraint, or the like. The attachment device 120 includes a body or plate member 122 configured to be attached to the joist J.

Figure 5:
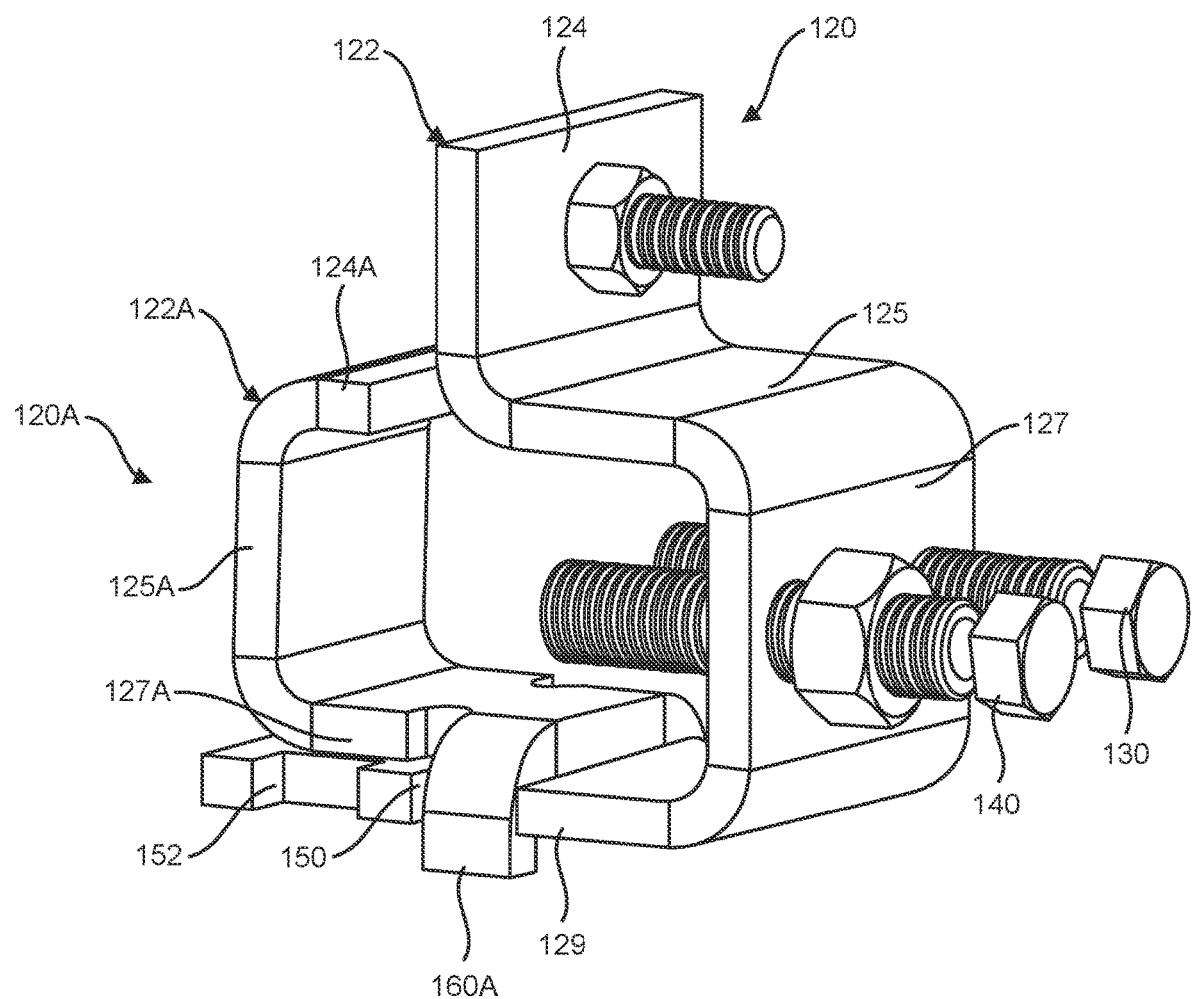
FIG. 5 is a perspective of the attachment device of FIG. 4 and a second attachment device coupled to the attachment device.

The plate member 122 has a first planar portion 124, a second planar portion 125 extending from the first planar portion, a third planar portion 127 extending from the second planar portion, and a fourth planar portion 129 extending from the third planar portion. The first planar portions 124 provides a contact surface for engaging the web W of the joist J. In the illustrated embodiment, the first planar portion has a rectangular shape. However, the first planar portion 24 could be formed in any suitable shape such as round or oblong without departing from the scope of the disclosure. The second portion 125 extends orthogonally from the first planar portion 24 and provides a contact surface for engaging a top of bottom flange F of the joist J. The third planar portion 127 extends orthogonally from the second planar portion 125 and extends generally parallel to and opposite a side edge of the bottom flange F of the joist J. The fourth planar portion 129 extends orthogonally from the third planar portion 127 and extends generally parallel to and opposite a bottom of the bottom flange F of the joist J. The fourth planar portion 129 has a length extending from an end of the fourth planar portion connected to the third planar portion 127 to a free end of the fourth planar portion. A first pair of notches 150 (FIG. 5) are formed in side edges of the fourth planar portion 129 at a first distance from the end of the fourth planar portion connected to the third planar portion 127. A second pair of notches 152 are formed in the side edges of the fourth planar portion 129 at a second distance from the end of the fourth planar portion connected to the third planar portion 127 that is greater than the first distance.

A fastener hole (not shown) in the third planar portion 127 is configured to receive a fastener 130 for securing the attachment device 120 to the joist J. In one embodiment, the fastener 130 is a standard bolt fastener. A second hole (not shown) in the third planar portion 127 is configured to receive a fastener 140 for securing the attachment device 120 to the joist J, and for attaching the fitting 14 to the attachment device. In one embodiment, the fastener 140 is a standard bolt fastener. As will be explained in greater detail below, the fasteners 130, 140 do not make holes extending entirely through the joist J when securing the attachment device to the joist.

The attachment device 120 may be considered a first attachment device, and is configured for engagement with a first face of the web W of the joist J. A second attachment device 120A is configured for engagement with an opposite face of the web W of the joist J. The second attachment device 120A comprises a plate member 122A including a first planar portion 124A, a second planar portion 125A extending from the first planar portion, a third planar portion 127A extending from the second planar portion, and a pair of arms 160A (only one is shown) extending from side edges of the third planar portion. The arms 160A are bent out of plane from the third planar portion 127A. The first planar portion 124A provides a contact surface for engaging the web W of the joist J at an end surface of the first planar portion. The first planar portion 124A also provides a contact surface for engaging the top of the bottom flange F of the joist J along an inner surface of the first planar portion. The second planar portion 125A extends orthogonally from the first planar portion 124A and extends generally parallel to and opposite the opposite side edge of the bottom flange F of the joist J. The third planar portion 127A extends orthogonally from the second planar portion 125A and extends generally parallel to and opposite the bottom of the bottom flange F of the joist J. The arms 160A extending from the third planar portion 127A may be received in one of the pairs of notches 150, 152 in the fourth planar portion 129 of the first attachment device 120 to couple the second attachment device 120A to the first attachment device. To this effect, the relative position of the surfaces of the attachment devices 120, 120A can be adjusted. In particular, the spacing between an inner surface of the first planar surface 124 of the first attachment device 120 and the end surface of the first planar surface 124A of the second attachment device 120A is adjusted depending on the notches 150, 152 in which the arms 160A are received. Further the spacing between an inner surface of the third planar surface 127 of the first attachment device 120 and the inner surface of the second planar surface 125A of the second attachment device 120A is adjusted depending on the notches 150, 152 in which the arms 160A are received. The spacing between the surfaces is increased when the arms 160A are received in notches 152.

When the fasteners 130, 140 are received in their respective fastener holes and engaged with the flange F of the joist J, the tightening of the fasteners pulls the second attachment device 120A toward the first attachment device 120 thereby clamping the attachment devices to the joist. The fasteners 130, 140 engage the side edge of the flange F but they do not extend entirely through the flange. Therefore, securing the attachment devices 120, 120A to the joist J does not involve making any through holes in the joist. Accordingly, the strength and structural integrity of the joist J is maintained after attachment of the attachment devices 120, 120A. The use of the two attachment devices 120, 120A also allows the size of each attachment device to be reduced while still providing a sufficient attachment structure. Additionally, the ability to adjust the position of the second attachment device 120A relative to the first attachment device 120 allows for the attachment devices to be used with varying size joists. In particular, the spacing between the opposing surfaces of the attachment devices 120, 120A allows the attachment devices to be used with joists having different web and/or flange thicknesses.

Figure 6:
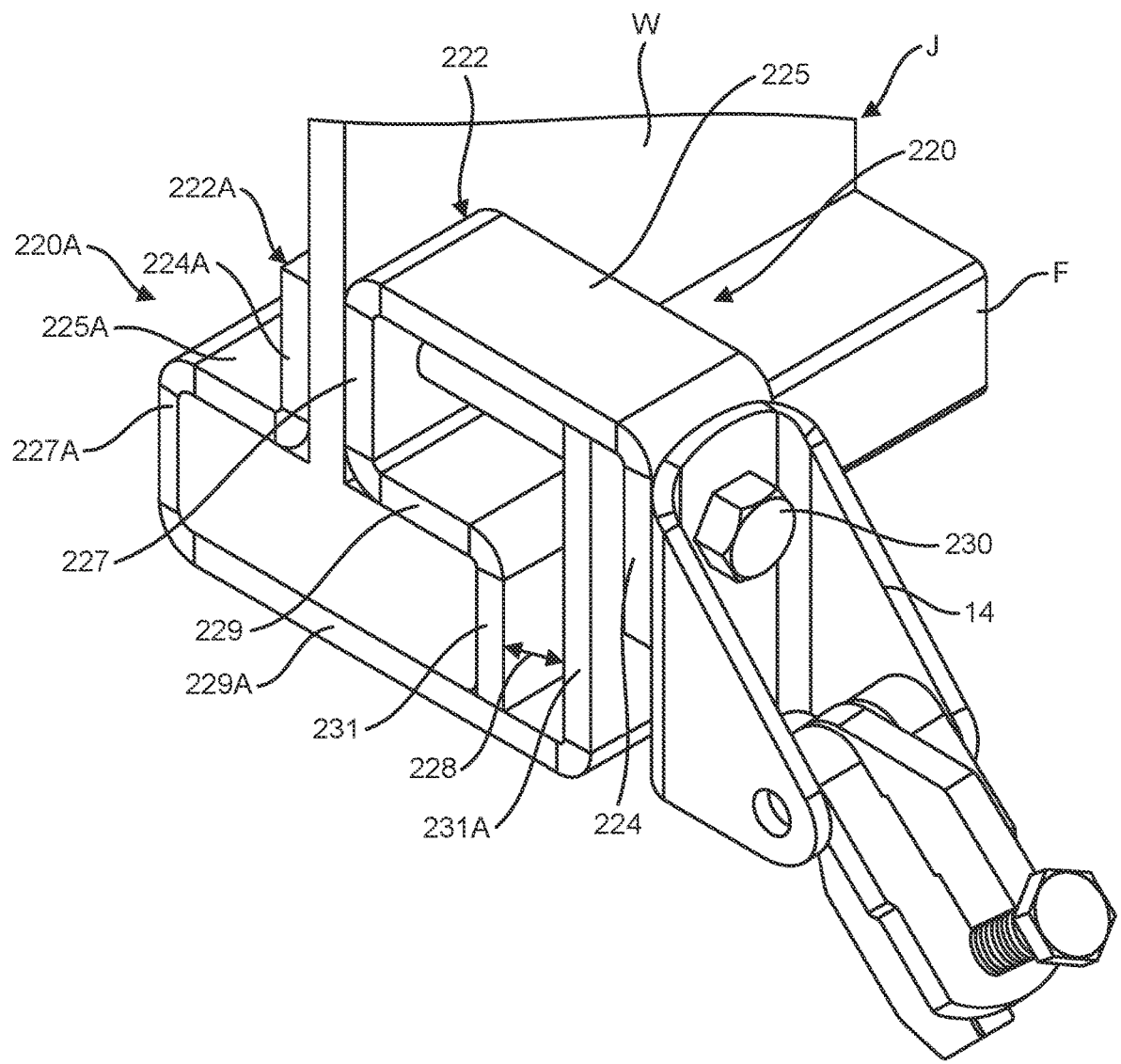
FIG. 6 is a perspective of a third embodiment of an attachment device attached to a structural component according to the teachings of the present disclosure.

Referring to FIG. 6, a third embodiment of an attachment device for attaching to a structural component is generally indicated at reference numeral 220. The attachment device 220 is configured to be attached to a structural component, such as a wooden I-joist J, and to a connection fitting 14 for attachment to a suitable sway brace restraint, or the like. The attachment device 220 includes a body or plate member 222 configured to be attached to the joist J.

The plate member 222 has a first planar portion 224, a second planar portion 225 extending from the first planar portion, a third planar portion 227 extending from the second planar portion, a fourth planar portion 229 extending from the third planar portion, and a fifth planar portion 231 extending from the fourth planar portion. The first planar portions 124 provides an engagement surface for the fitting 14. The first planar surface 224 extends generally vertically when the attachment device 220 is attached to the joist J. The second planar portion 225 extends orthogonally from the first planar portion 224 and generally horizontally when the attachment device 20 is attached to the joist J. The third planar portion 227 extends orthogonally from the second planar portion 225 and provides a contact surface for engaging the web W of the joist J. The fourth planar portion 229 extends orthogonally from the third planar portion 227 and provides a contact surface for engaging a top of the bottom flange F of the joist J. The fifth planar portion 231 extend orthogonally from the fourth planar portion 229 and provides a contact surface for engaging a side edge of the bottom flange F of the joist J.

A fastener hole (not shown) in the first planar portion 224 is configured to receive a fastener 230 for securing the attachment device 220 to the joist J, and for attaching the fitting 14 to the attachment device. In one embodiment, the fastener 230 is a standard bolt fastener. As will be explained in greater detail below, the fastener 230 does not engage or make a hole in the joist J when securing the attachment device to the joist.

The attachment device 220 may be considered a first attachment device, and is configured for engagement with a first face of the web W of the joist J. A second attachment device 220A is configured for engagement with an opposite face of the web W of the joist J. The second attachment device 220A comprises a plate member 222A including a first planar portion 224A, a second planar portion 225A extending from the first planar portion, a third planar portion 227A extending from the second planar portion, a fourth planar portion 229A extending from the third planar portion, and fifth planar portion 231A extending from the fourth planar portion. The first planar portion 224A provides a contact surface for engaging the web W of the joist J at an inner surface of the first planar portion. The second planar portion 225A extends orthogonally from the first planar portion 224A and provides a contact surface for engaging the top of the bottom flange F of the joist J along an inner surface of the second planar portion. The third planar portion 227A extends orthogonally from the second planar portion 225A and provides a contact surface for engaging a side edge of the flange F of the joist J. The fourth planar portion 229A extends orthogonally from the third planar portion 227A and provides a contact surface for engaging a bottom of the bottom flange F of the joist J. The fifth planar portion 231A extends orthogonally from the fourth planar portion 229A and extends generally parallel to and opposite an opposite side of the flange F of the joist J. A fastener hole (not shown) in the fifth planar portion 231A is configured to receive the fastener 230. A clearance gap 228 is provided between an outer surface of the fifth planar portion 231 of the first attachment device 220 and an inner surface of the fifth planar surface 231A of the second attachment device 220A. As will be explained in greater detail below, the clearance gap 228 configures the attachment devices 220, 220A to be attached to joists J of different sizes.

When the fastener 230 is received in the fastener holes, the fastener engages with an outer surface of the third planar portion 227 of the first attachment device 220. The tightening of the fastener 230 pushes the first attachment device 220 toward the second attachment device 220A and pulls the second attachment device toward the first attachment device thereby clamping the attachment devices to the joist J. Therefore, securing the attachment devices 220, 220A to the joist J does not involve making any holes through the joist J. In fact, securing the attachment devices 220, 220A does not involve contacting the fastener 230 with the joist J. Rather, the frictional clamping force created by the fastener 230 and the attachment devices 220, 220A holds the attachment devices to the joist J. Accordingly, the strength and structural integrity of the joist J is maintained after attachment of the attachment devices 220, 220A. This also increase the efficiency of installation by eliminating the time needed to drill holes into the joist J. The use of the two attachment devices 220, 220A also allows the size of each attachment device to be reduced while still providing a sufficient attachment structure. Additionally, the clearance gap 228 between the attachment devices 220, 220A allows for the attachment devices to be used with varying size joists. In particular, the spacing between the opposing surfaces of the attachment devices 220, 220A allows the attachment devices to be used with joists having different web and/or flange thicknesses and/or flange widths.

Figure 7:
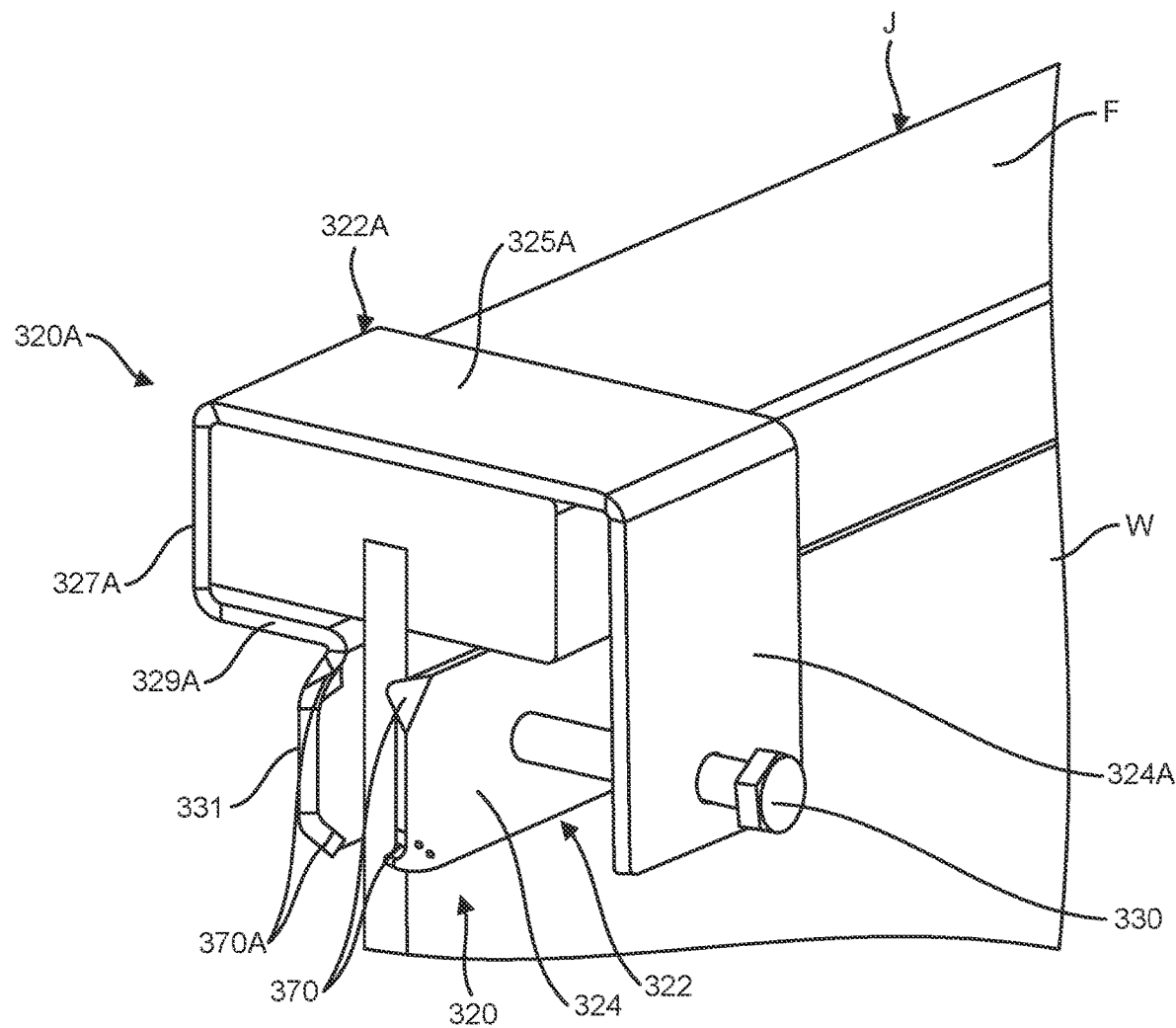
FIG. 7 is a perspective of a fourth embodiment of an attachment device attached to a structural component according to the teachings of the present disclosure.

Referring to FIG. 7, a fourth embodiment of an attachment device for attaching to a structural component is generally indicated at reference numeral 320. The attachment device 320 is configured to be attached to a structural component, such as a wooden I-joist. The attachment device 320 includes a body or plate member 322 configured to be attached to the joist J.

The plate member 322 has a planar portion 324. The planar portions 324 provides a contact surface for engaging the web W of the joist J. In the illustrated embodiment, the first planar portion has a rectangular shape. However, the first planar portion 324 could be formed in any suitable shape such as round or oblong without departing from the scope of the disclosure. Corners 370 of the plate member 322 are bent out of plane with the planar portion 324. When the plate member 322 is engaged with the web W of the joist, the corners 370 bite into the web to hold the plate member to the joist J as will be explained in greater detail below.

The attachment device 320 may be considered a first attachment device, and is configured for engagement with a first face of the web W of the joist J. A second attachment device 320A is configured for engagement with an opposite face of the web W of the joist J. The second attachment device 320A comprises a plate member 322A including a first planar portion 324A, a second planar portion 325A extending from the first planar portion, a third planar portion 327A extending from the second planar portion, a fourth planar portion 329A extending from the third planar portion, and fifth planar portion 331A extending from the fourth planar portion. The first planar portion 324A extends generally parallel to and opposite a side edge of a flange F of the joist J. The second planar portion 325A extends orthogonally from the first planar portion 324A and provides a contact surface for engaging a top of the flange F of the joist J along an inner surface of the second planar portion. The third planar portion 327A extends orthogonally from the second planar portion 325A and provides a contact surface for engaging an opposite side edge of the flange F of the joist J. The fourth planar portion 329A extends orthogonally from the third planar portion 327A and provides a contact surface for engaging a bottom of the flange F of the joist J. The fifth planar portion 331A extends orthogonally from the fourth planar portion 329A and provides a contact surface for engaging the web W of the joist J. Corners 370A of the fifth planar portion 331A are bent out of plane. When the fifth planar portion 331A is engaged with the web W of the joist J, the corners 370A bite into the web to hold the plate member 332A to the joist J.

A fastener hole (not shown) in the first planar portion 324A of the second attachment device 320A is configured to receive a fastener 330 for securing the attachment devices 320, 320A to the joist J, and for attaching a fitting (not shown) to the attachment device. In one embodiment, the fastener 330 is a standard bolt fastener. As will be explained in greater detail below, the fastener 330 does not make a hole in the joist J when securing the attachment devices to the joist J.

When the fastener 330 is received in the fastener hole in the second attachment device 320A, the fastener engages with an outer surface of the planar portion 224 of the first attachment device 320. The tightening of the fastener 330 pushes the first attachment device 320 toward the second attachment device 320A and pulls the second attachment device 320A toward the first attachment device thereby clamping the attachment devices to the joist J. The corners 370, 370A of the attachment devices 320, 320A will bite into the edges of the web W of the joist J further securing the attachment devices to the joist. Therefore, securing the attachment devices 320, 320A to the joist J does not involve making any holes through the joist J. In fact, securing the attachment devices 320, 320A does not involve contacting the fastener 330 with the joist J. Rather, the frictional clamping force and biting action created by the fastener 330 and the attachment devices 320, 320A holds the attachment devices to the joist J. Accordingly, the strength and structural integrity of the joist J is maintained after attachment of the attachment devices 320, 320A. This also increases the efficiency of installation by eliminating the time needed to drill holes into the joist J. The use of the two attachment devices 320, 320A also allows the size of each attachment device to be reduced while still providing a sufficient attachment structure.

It is apparent that the elements, features, and/or teachings set forth in each embodiment disclosed herein are not limited to the specific embodiments the elements, features and/or teachings are described in. Accordingly, it is understood that the elements features and/or teachings described in one embodiment may be applied to one or more of the other embodiments disclosed herein.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An attachment device for attaching to a structural component of a building to couple a fitting to the structural component, wherein the structural component has a web portion and a flange extending from an edge margin of the web portion, the attachment device comprising:
   a plate member configured to be attached directly to the structural component and engaged by the fitting to mount the fitting to the attachment device for coupling the fitting to the structural component,
   wherein the plate member comprises:
   a web-engaging planar portion configured to engage the web portion of the structural component, wherein the web-engaging planar portion is located within a first plane region;
   a lower planar portion configured to receive a fastener for securing the attachment device to the structural component wherein the lower planar portion is located within a second plane region, wherein the second plane region is spaced away from the first plane region along a first direction, and
   a recess disposed between the web-engaging planar portion and the lower planar portion, the recess defined by a first planar portion extending orthogonally from the web-engaging planar portion and a second planar portion extending downwardly from the first planar portion, the recess being configured to receive the flange of the structural component between the first and second planar portions.

2. The attachment device of claim 1, further comprising the fastener for securing the attachment device to the structural component, wherein the lower planar portion defines an opening for receiving the fastener.

3. The attachment device of claim 2, wherein the web-engaging planar portion defines a second opening for receiving a second fastener for attaching the attachment device to the web portion of the structural component.

4. The attachment device of claim 1, wherein the attachment device comprises a first attachment device for engaging a first surface of the structural component, further comprising a second attachment device for engaging a second surface of the structural component opposite the first surface.

5. The attachment device of claim 4, further comprising the fastener for attaching the first and second attachment devices to the structural component.

6. The attachment device of claim 5, wherein the fastener attaches the first and second attachment devices to the structural component through clamping engagement.

7. The attachment device of claim 5, wherein the fastener attaches the first and second attachment devices to the structural component without extending through the structural component.

8. The attachment device of claim 7, wherein the fastener does not contact the structural component.

9. The attachment device of claim 5, wherein the fastener extends through a hole in at least one of the first and second attachment devices.

10. The attachment device of claim 9, wherein the fastener extends through holes in the first and second attachment devices.

11. The attachment device of claim 4, wherein the first and second attachment devices are configured to attach to structural components of different sizes.

12. The attachment device of claim 1, in combination with the structural component, wherein the structural component comprises a wooden I-joist.

13. The attachment device of claim 1, wherein the first direction extends along a direction parallel to both first and second plane regions.

14. The attachment device of claim 1, wherein the web-engaging planar portion defines a hole for receiving a fastener such that the web-engaging planar portion is configured to secure the fitting at the hole.

* * * * *